United States Patent [19]

Fukuda et al.

[11] Patent Number: 5,052,046

[45] Date of Patent: Sep. 24, 1991

[54] IMAGE PROCESSING METHOD AND APPARATUS THEREFOR

[75] Inventors: Kouji Fukuda, Kawasaki; Masatoshi Hino, Sagamihara; Tetsuo Machida, Tokyo, all of Japan

[73] Assignee: Hitachi, Ltd., Tokyo, Japan

[21] Appl. No.: 353,037

[22] Filed: May 17, 1989

[30] Foreign Application Priority Data

May 19, 1988 [JP] Japan .................................. 63-120477

[51] Int. Cl.$^5$ ................................................ G06K 9/00
[52] U.S. Cl. ........................................ 382/41; 382/27; 382/49
[58] Field of Search ................ 382/54, 47, 27, 56, 382/41, 49; 364/521; 365/230.03, 239

[56] References Cited

U.S. PATENT DOCUMENTS 4,434,502 2/1984 Arakawa et al. ..................... 382/41

OTHER PUBLICATIONS

IEEE Computer, Nov., 1981, pp. 53–67, "Computer Architectures for Pictorial Inf. Systems", Per Erik Danielsson et al.

*Primary Examiner*—Leo H. Boudreau
*Attorney, Agent, or Firm*—Fay, Sharpe, Beall, Fagan, Minnich & McKee

[57] ABSTRACT

An image processing apparatus that processes image data consecutively in the column and row directions has an image memory, a reading unit, a temporary memory and an operative unit. The image memory stores image data consecutively in column and row directions on a pixel unit basis. The reading unit reads from the image memory a series of pixels within one column at one row and at least one pixel adjacent to the one row in the column direction. The temporary memory sequentially stores a number of groups of pixels read from the reading unit as is necessary for image processing. The operation unit reads the values of an objective pixel and pixels necessary for a neighborhood operation of the objective pixel from the temporary memory, and subjects the values to a neighborhood operation to determine the output value of the objective pixel.

14 Claims, 7 Drawing Sheets

IMAGE PROCESSING METHOD AND APPARATUS THEREFOR

BACKGROUND OF THE INVENTION

The present invention relates to an image processing method and apparatus therefor, and more particularly to an image processing method and apparatus therefor capable of image processing at high speed and suitable for realizing a compact apparatus.

In an image processing apparatus which obtains a distinctive and clear image with no noise by processing an unclear original image with noises, a matrix calculation is performed based on the value of an objective pixel to be image processed in an original image and on the values of neighborhood pixels, to thus determine a new value of the objective pixel.

Various types of conventional image processing apparatus for performing an operation (hereinafter called a neighborhood operation) are known wherein the value of a pixel to be processed, i.e., an objective pixel and the values of neighborhood pixels supplied as input data are calculated to determine an output value of the objective pixel. In the meantime, original image data are generally arranged consecutive in the column direction (i.e., in a line direction) within the address space of an image memory. Therefore, the addresses of the original image adjacent in the row direction (i.e., in the direction perpendicular to the line) are different by a certain amount in most cases. In a neighborhood operation, the values of neighborhood pixels are read from the image memory, stored in a buffer, and thereafter supplied to a processing unit. Therefore, it becomes necessary to access the image memory several times until all the neighborhood pixels necessary for a neighborhood operation for one objective pixel have been read. Therefore, it may occur that in a neighborhood operation for another pixel, the addresses used in the previous operation are again accessed, resulting in a number of accesses and in a long process time.

To solve this problem, according to a conventional method, for example, as disclosed in IEEE, Computer, November, 1981, pp. 53 to 67, the number of accesses is reduced taking into consideration the fact that the difference between the address of one pixel and the address of adjacent pixel at a different line is constant throughout any position of the lines if an image to be processed is present in a rectangular frame. This method prepares an additional temporary memory (e.g., shift register) for storing a series of pixels necessary for matrix calculation. Original image data are sequentially read from an original image memory one word (one address unit) after another in the column direction. The read-out data are shifted in synchro with data processing to thus automatically derive neighborhood pixels. According to this method, it is possible to access all addresses of an original image once for each address without duplicate accesses. However, if for example a 3×3 pixel matrix calculation is applied, eight consecutive pixels are required as the neighborhood pixels. Therefore, it becomes necessary to use a temporary memory whose capacity corresponds to 2 lines and three pixels.

According to other prior art not using such a line memory, a same address of an original image memory is required to be accessed plural times, thus posing a problem of a long transfer time of image data.

In contrast with the above, the prior art using a line memory shown in the above-described publication accesses a same address of an original image memory only one time so that data transfer time becomes short. However, for a 3×3 matrix calculation for example, line memory in excess of 2 lines becomes necessary. Therefore, the memory capacity becomes large, and in addition a complicated control circuit for the line memory is needed.

SUMMARY OF THE INVENTION

It is an object of the present invention to provide an image processing method and apparatus therefor capable of eliminating the prior art disadvantages, with a temporary memory of small capacity and with short data transfer time.

It is another object of the present invention to provide an image processing method and apparatus therefor which does not use such a line memory as shown in the above-described publication but uses a temporary memory of very small capacity, and can realize image processing with a small number of accesses to the same degree as that when using the conventional line memory, namely, with only one access (read memory) to a same address without duplicate accesses.

To achieve the above objects, according to the present invention, an image processing apparatus for image processing image data consecutive in the column and row directions and determining an output value of an objective pixel to be image processed by processing the value of the objective pixel and the values of pixels adjacent to the objective pixel in the column and row directions necessary for a neighborhood operation with respect to the objective pixel, includes an image memory, a reading unit, a temporary memory, and an operation unit.

the image memory stores the image data consecutively in the column and row directions on a pixel unit basis.

The reading unit reads from the image memory a series of pixels within one column at one row and at least one pixel adjacent to the one row in the column direction as is necessary for the image processing as one group at a time on a group unit basis.

The temporary memory sequentially stores the one group of pixels read from the reading unit, by the amount corresponding to a number of groups necessary for the image processing adjacent in the row direction, as one unit of pixel groups.

The operation unit reads the values of the objective pixel and pixels necessary for the neighborhood operation of the objective pixel from the image memory, and subjects the values to the neighborhood operation to determine and output the pixel value of the objective pixel.

To achieve the above object, according to the image processing apparatus of this invention, a series of pixels (e.g., corresponding to one word) at the same row on the same column are collectively read from an image memory and stored in a temporary memory (e.g., shift register). An output pixel value of each of objective pixels (pixels to be processed to obtain neighborhood operation results) is determined based on the value of the objective pixel and the values of the neighborhood pixels of an objective pixel. Specifically, there is provided reading means for reading from the image memory the objective pixel and the neighborhood pixels adjacent the objective pixel in the column direction necessary for a neighborhood operation, as one group, on a group unit basis. One group for example includes one word and two neighborhood pixels. There is also provided a temporary memory for sequentially storing the one group pixels by the amount of a number of groups in the row direction necessary for a neighborhood operation (e.g., three groups over three columns for 3×3 pixel matrix calculation).

The order of reading pixels from the image memory and storing them in the temporary memory is as follows. Image data are sequentially read in the same row direction (e.g., from up to down) along the image region extending in the row direction and having a width corresponding to a series of pixels and neighborhood pixels at the same row (e.g., a width corresponding to one word and 2 neighborhood pixels), and stored in the temporary memory. Therefore, in a neighborhood operation, a series of pixels at a column are sequentially processed in the column direction. After completion of all of the series of pixels at that column, a neighborhood operation for a series of pixels at the next column at the same row is performed.

A more particular operation will be given in the following.

In the case of a 3×3 pixel matrix calculation for example one word (same address area) of which is constituted with 8 pixels in the column direction (in the right-and-left direction), read first from the image memory is one group of pixels having a width of one word+2=10 pixels in one row (same address area) on the first column. Next, one group of pixels having 10 pixel width at the second column immediately below the first column is read. Succeedingly, 10 pixels at the third column below the second column are read. The read-out pixels are stored in the temporary memory as three groups each having 10 pixels. Each of the 8 pixels constituting one word on the second column is subjected to a neighborhood operation while referring to 8 pixels surrounding the objective pixel. After completion of this neighborhood operation, pixels at the first column are erased from the temporary memory, and the contents of the temporary memory are shifted to read 10 pixels at the fourth column. A similar neighborhood operation for 8 pixels of one word at the third column is performed. In the similar manner, the neighborhood operation of one word at the first row (left side end row) in the column direction (right-and-left direction) is performed for respective columns (except the uppermost and lowermost columns) from up to down. After completion of such operation, a similar neighborhood operation of one word at the second row (right side of the first column) is performed. Such operations are repeated for a whole image screen.

The capacity of the temporary memory is sufficient only if it has a capacity corresponding to 10×3 pixels. A desired operation can thus be performed with a temporary memory of small capacity. Specifically, 10 pixels on a certain column are stored at a maximum only for a period while the neighborhood operation continues for three words including the remaining two columns. In processing one pixel, an access to the image memory is carried out only once without duplicate accesses, thus shortening an image transfer time.

Any specific unit is not provided on the write side of the image memory so that there is no fear of destroying image data. In addition, for controlling data reading from the memory cells constituting the image memory via the output data lines, there are provided additional data lines for neighborhood pixels, so that there is no fear of outputting erroneous data.

DESCRIPTION OF THE PREFERRED EMBODIMENTS

Preferred embodiments of the image processing apparatus according to the present invention will be described with reference to the accompanying drawings.

Figure 1:
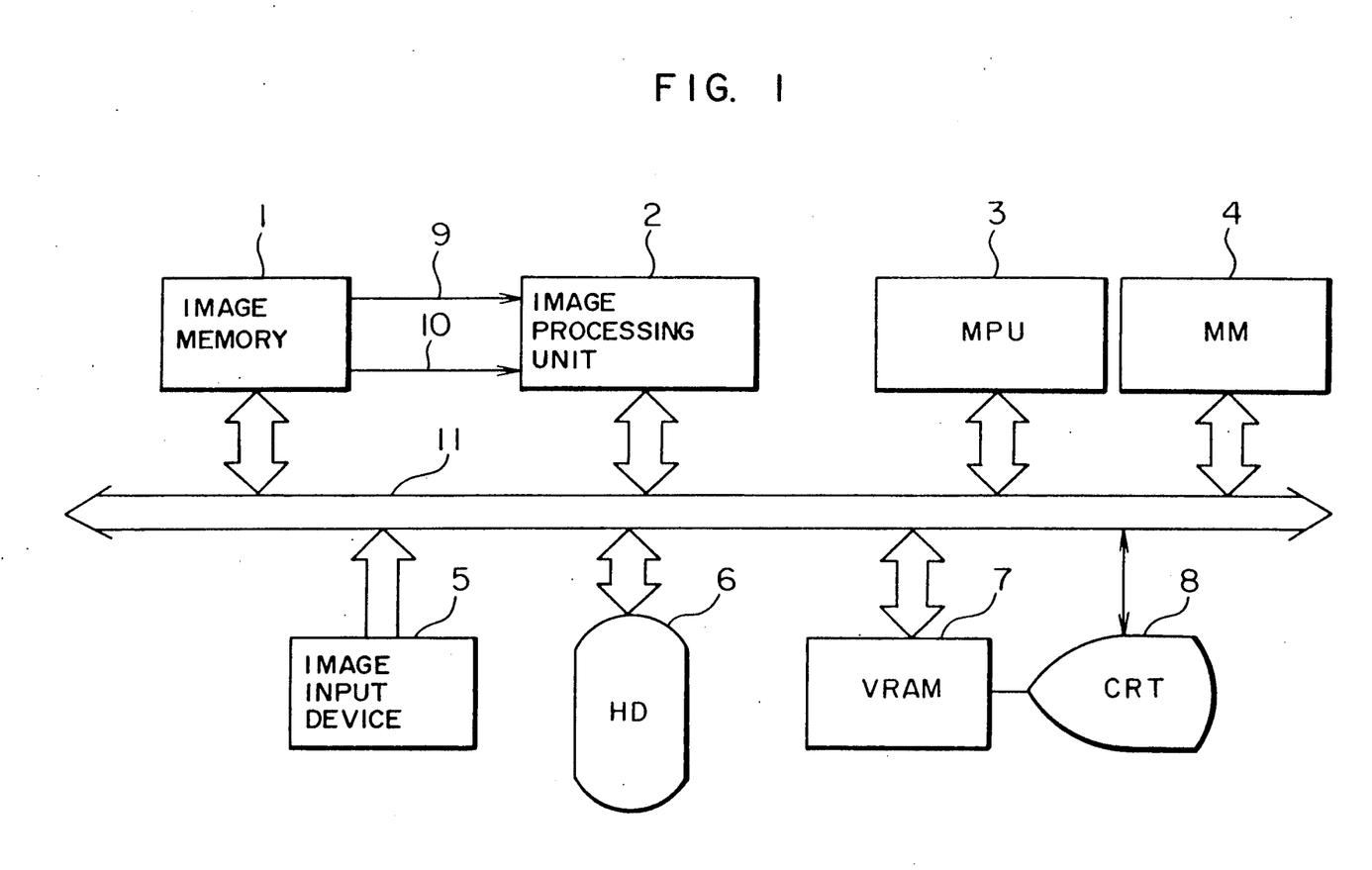
FIG. 1 is a block diagram showing an example of an image processing system to which an image processing apparatus of this invention is applied.

FIG. 1 is a block diagram showing an example of the image processing system embodying the present invention. In FIG. 1, an image memory 1 stores therein image data stored in a secondary storage such as a hard disk (HD) 6 and data inputted from an image input device 5 such as a scanner. An image processing unit 2 performs a neighborhood operation of an image by processing image data of an original image stored in the image memory 1. The processed results are again stored in the image memory 1 or HD 6, or loaded in a cathode ray tube (CRT) display memory 7 such as a volatile random access memory (VRAM) to confirm the image displayed on a CRT 8. Data control of each module is carried out by way of a system bus 11. Extended data lines 9 and 10 are used for data reference by the image processing unit 2. In this embodiment, among two-dimensional image data stored in the image memory 1, neighborhood pixel data in the column direction at the right and left end portions adjacent an image area identified by an address and referred to by the image processing unit 2 are transferred via the extended data lines 9 and 10. Specifically, to the image processing unit 2, not only image data identified by designated address can be supplied via the bus 11, but also neighborhood pixel data can be inputted via the lines 9 and 10 at the same time. This is the most distinctive function of this invention. The invention positively uses such a function to realize a processing apparatus for a local image which apparatus is of a small size and high speed. In this embodiment, an apparatus for performing a 3×3 matrix calculation for local image processing is provided by way of example.

Figure 2:
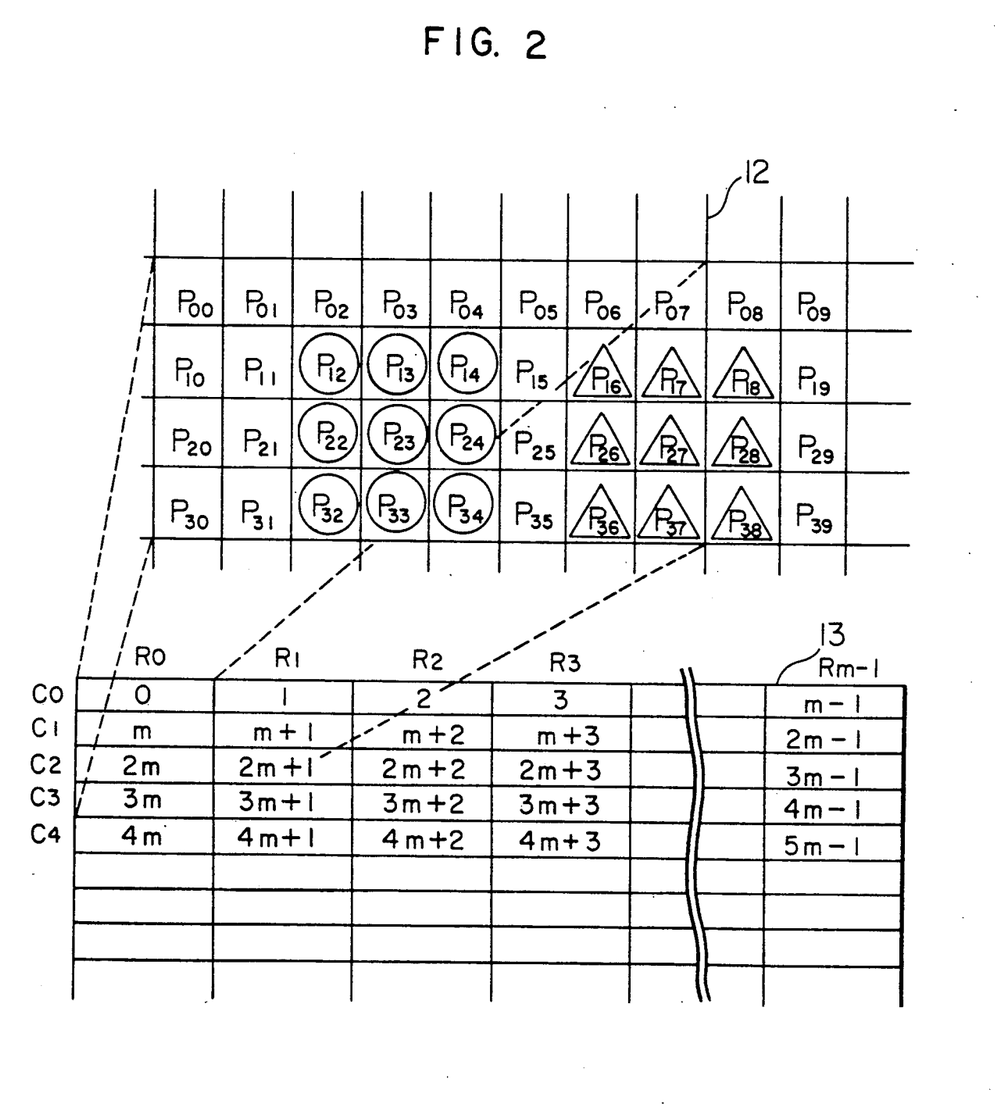
FIG. 2 shows an example of an address map of the image memory shown in FIG. 1.

FIG. 2 shows a bit map 12 of an original image stored in the image memory 1. A table (address map) 13 shows a relationship between memory addresses of an image on a whole screen and the two-dimensional bit map 12: 0, 1, 2, ..., m−1, m, ..., 5m−1, ... represent addresses. C0, C1, C2, ... represent columns (lines), and R0, R1, R2, ... represent rows. It is assumed here that one row corresponds to one address by way of example.

The image memory 1 stores original image data consecutively in the column and row directions.

In this embodiment, addresses on each column (line) are consecutive, and data for one column are stored in the image memory 1 at locations identified by m addresses. The two-dimensional arrangement of data conforms with the pattern of an original image itself. The area enclosed by a bold frame in the address map 13 is shown as a detailed and enlarged area in the bit map 13. $P_{01}, \ldots, P_{07}, P_{08}$ represent bits for respective pixels. In this embodiment, one pixel corresponds to one bit. The embodiment is applicable to the case where one pixel is constituted with several bits. In this embodiment, respective pixels are disposed in the order of bits (consecutively in the same order as that of pixels of an original image pattern). Data corresponding to eight pixels for example are stored in an area identified by one address. Data corresponding to eight pixels, e.g., $P_{20}$ to $P_{27}$ constitute one word. Pxy shown in FIG. 2 is a discriminator for pixel, where x represents a column number and y a pixel number within that column. For instance, $P_{13}$ represents the fourth pixel from the left end in the second column C1. In a 3×3 matrix calculation, output pixel values are determined through a neighborhood operation based on a total 9 pixels including a pixel to be processed, i.e., an objective pixel, and consecutive 8 neighborhood pixels. This matrix calculation is well known, and the detail thereof is omitted. Such calculation includes an operation that an edge is discriminated if both sides are white and black, and a black is discriminated if both sides are black, and other operations. In calculating a pixel $P_{23}$ shown in FIG. 2, pixel data of 9 pixels $P_{12}, P_{13}, P_{14}, P_{22}, P_{23}, P_{24}, P_{32}, P_{33},$ and $P_{34}$ surrounded with a circle in FIG. 2 are required. In order to supply the pixel data to the image processing unit, it is necessary to read data from the image memory at three addresses m and 2m and 3m. In calculating a pixel such as $P_{27}$ adjacent the border of words (a word is a data transfer unit, i.e., address unit), a pixel at the right is present in the area at another address. Therefore, it becomes necessary to read data at three addresses m, 2m and 3m as well as at three addresses m+1, 2m+1 and 3m+1. A minimum capacity of a memory for storing image data supplied to the image processing unit is a capacity of 3×3 pixel matrix per one pixel neighborhood calculation process. However, for a pixel such as $P_{23}$ which is not adjacent the word border three source image read accesses are required. On the other hand for a pixel such as $P_{27}$, which is adjacent the word border, six source image read accesses are required. In other words, for an image screen having a pixels per one column and l columns within the screen, the necessary number of accesses per one screen becomes:

$$(3\times 6/8\times a + 6\times 2/8\times a)\times l = 15/4\times a\times l \qquad (1)$$

assuming that one word is 8 bits or pixels. With the method proposed in the above-described prior art document, a line memory of a capacity of 2 columns and 3 pixels is provided, and each time one word has been processed, the pixels of one word at the end portion (oldest pixels) in the memory are removed to fetch new one word pixels at the top portion, thus sequentially shifting pixels. Therefore, it is not necessary to access the same image data plural times. The number of accesses corresponds to the capacity of an original image (number of addresses). Namely, the number of accesses (one access per one address) per one screen becomes:

$$a/8\times l = \tfrac{1}{8}\times a\times l \qquad (2)$$

In contrast with the above, according to the method of this embodiment, there is not provided a line memory, and the memory capacity for storage of image data is limited only to 3 words and 6 pixels while allowing the same number of data transfers as that indicated by the equation (2).

Figure 3:
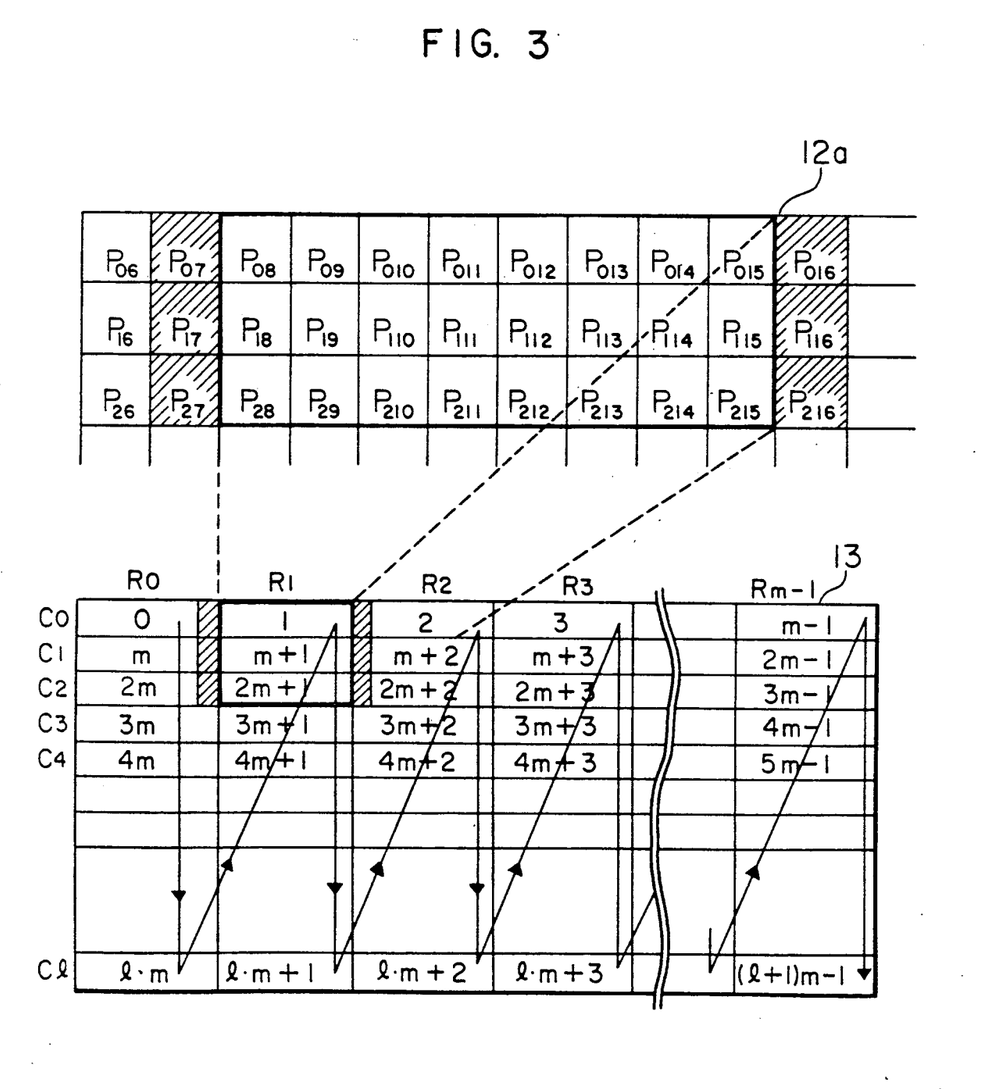
FIG. 3 shows an example of the order of accesses to the image memory shown in FIG. 1 according to the embodiment of this invention.

FIG. 3 shows a relationship between image data loaded in the image processing unit 2 and the bit map of the image memory. For instance, in performing a neighborhood calculation of output pixel values of pixels $P_{18}, P_{19}, \ldots, P_{115}$ at address (m+1) shown in the address map 13 of the image memory 1, image data 12a to be loaded in the image processing unit 2 include pixel data at address 1 ($P_{08}$ to $P_{015}$), address (m+1) ($P_{18}$ to $P_{115}$), address (2m+1) ($P_{28}$ to $P_{215}$), right end pixel data at addresses 0, m and 2m ($P_{07}, P_{17}, P_{27}$), and left end pixel data at addresses 2, (m+2) and (2m+2) ($P_{016}, P_{116}, P_{216}$). According to the arrangement of the image memory 1 of this invention, in reading data at address (m+1) for example, an access by the address (m+1) allows to read not only the pixels $P_{18}, P_{19}, \ldots, P_{115}$ at the address (m+1), but also neighborhood pixels $P_{17}$ and $P_{116}$ in the column direction at that address. Therefore, in performing the neighborhood operation of all the above-described pixels, only three addresses of 1, (m+1) and (2m+1) are used in accessing the image memory. To process more efficiently, after completing the calculation of respective pixels $P_{18}$ to $P_{115}$, pixels $P_{28}, P_{29}$ to $P_{215}$ at address (2m+1) adjacent in the row direction are processed without processing pixels at address (m+2) adjacent in the column direction. In such a case, since the data at addresses (m+1) and (2m+1) have already been loaded to process the pixels at the address (m+1), the data at address (3m+1) are read into the area where the data at the address 1 are stored. By sequentially processing pixels on an access unit (word) basis in the column direction indicated by an arrow in FIG. 3, the matrix calculation for the whole image can be carried out only by reading once the original image. In the matrix calculation, each time one address unit is processed, a corresponding output is delivered. Therefore, the control of an original image reading address and an output write address can be carried out in synchronization with each other.

The neighborhood operation may be performed in the direction opposite to that shown in FIG. 3, e.g., after an operation for address (l·m) is performed, an operation for address (l−1)·m is performed.

Figure 4:
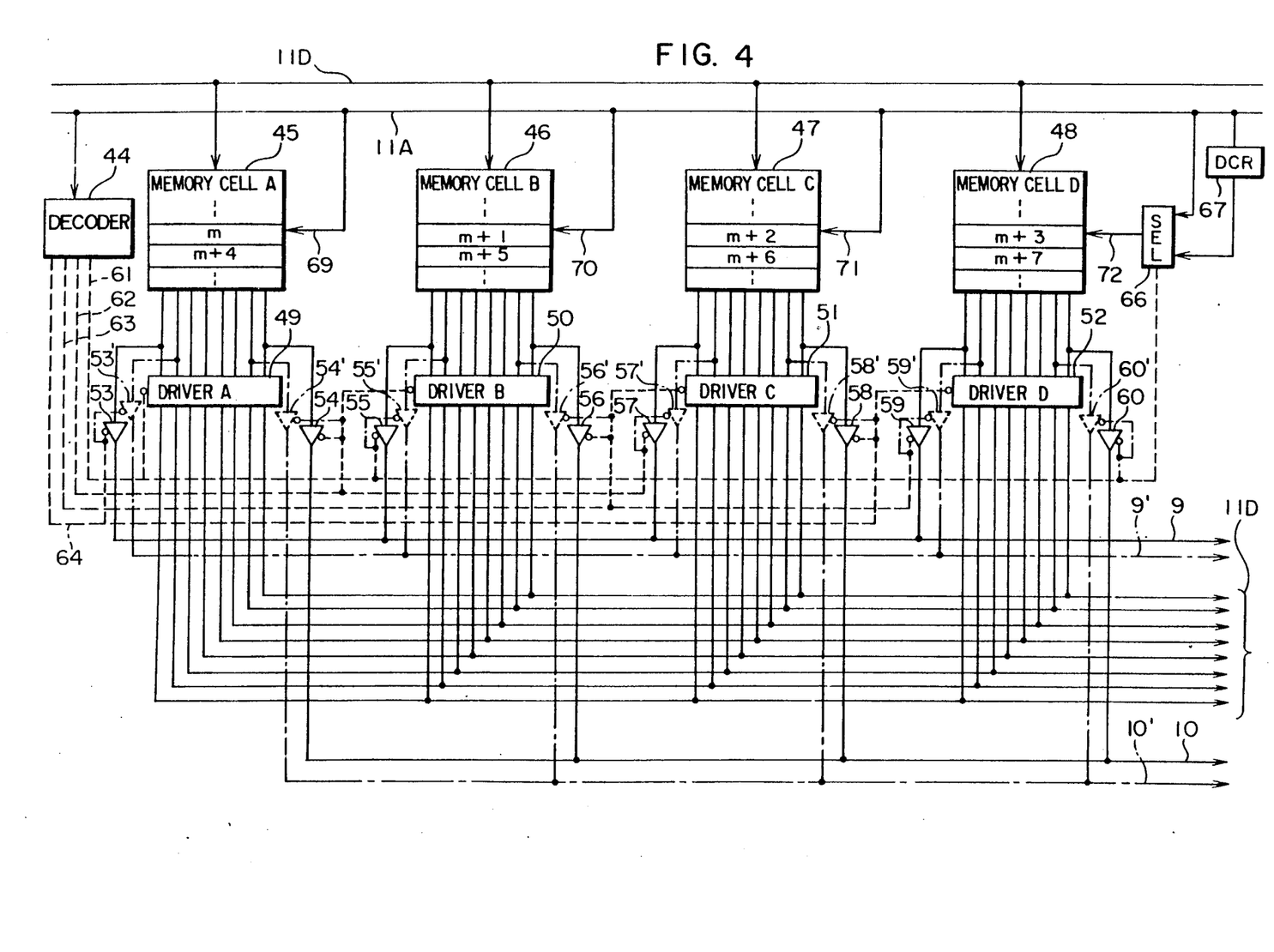
FIG. 4 is a circuit diagram showing an example of the arrangement of the image memory.

FIG. 4 shows an example of the arrangement of the image memory 1. In this example, a plurality of, e.g., four memory cells 45 to 48 each having eight input data lines and eight output data lines. In addition, in this embodiment, image data corresponding to one screen are stored in the four memory cells 45 to 48, and addresses are assigned to each memory cell such that the consecutive addresses are not assigned to the same memory cell. If the consecutive addresses are assigned to the same memory cell, the same cell is required to be read plural times in order to read pixels adjacent the right and left word borders. As a result, the access efficiency is degraded, and in addition a temporary data storage means becomes necessary. In view of the above, in this embodiment, addresses are sequentially assigned to a plurality of, e.g., four memory cells to solve such problem. Each memory cell A to D is provided with a corresponding driver A to D (49 to 52), and with a corresponding right and left pair of extended drivers A to D (53 to 60). For instance, if the decoded result at a decoder 44 of address data on an address line 11a of the system bus 11 has, for example, "00" at its least significant two bits, then it means that the system bus is requesting the memory cell A, and a cell A select signal 61 is outputted. Similarly, in case of "01", the memory cell B is requested, and a cell B select signal 62 is outputted. In case of "10" and "11", cell C and D select signals 63 and 64 are respectively outputted. Address assignment for the memory cells A to D is performed so as to match the enable control of the drivers A to D with the four cell selection signals. Consider now the case where address data on the address line 11A on the system bus 11 indicate an address (m+1) for example, and a cell B select 62 is outputted. In this case, the cell B select signal 62 is also supplied to the driver 54 (right-side extended driver A) to enable it so that the pixel $P_{17}$ at the right end at an address m is outputted onto the data line 10 as a left-side neighborhood pixel. Similarly, the driver 57 (left-side extended driver C) is enabled so that the right-side neighborhood pixel $P_{116}$ is outputted onto the data line 9. Address signals 69 to 72 inputted to the memory cells A to D may use the address data on the system bus excepting the least significant two bits. Consider then another case where the memory cell A 45 has been accessed at address (m+4), and a cell A select signal 61 has been outputted. In such a case, the left-side neighborhood pixel is a pixel to be outputted from the right-side extended driver D 60. However, address data on the address line 11A of the system bus 11 indicate the address (m+4). Therefore, in order to output the required pixel data at the right end at the address (m+3), it becomes necessary to input to the memory cell D a signal 72 representative of an address subtracted by 1 from address data. To this end, a decrementer 67 performs a calculation of subtracting address data by 1, and the result as well as the original data are adapted to be supplied to a selector 66. The cell A select signal 61 determines whether or not the address subtracted by 1 is to be selected. As described above, one access allows simultaneous reading one word data and the right and left neighborhood pixels adjacent the word borders. This embodiment uses a 3×3 pixel matrix calculation by way of example so that the system is so arranged to read respective one pixel at the right and left adjacent the word borders. However, if a 5×5 pixel matrix calculation is to be carried out, the similar control is applicable wherein extended data lines 9 and 10 are modified to output respective two pixels at the right and left adjacent the word borders.

Specifically, as shown by one-dot-chain lines in FIG. 4, right- and left-side extended drivers 53' to 60' as well as extended data lines 9' and 10' are additionally provided so that one access allows simultaneous reading of one word and the corresponding right and left, respective two neighborhood pixels.

Similarly, the same arrangement is applicable to other types of matrix calculation.

Figure 5:
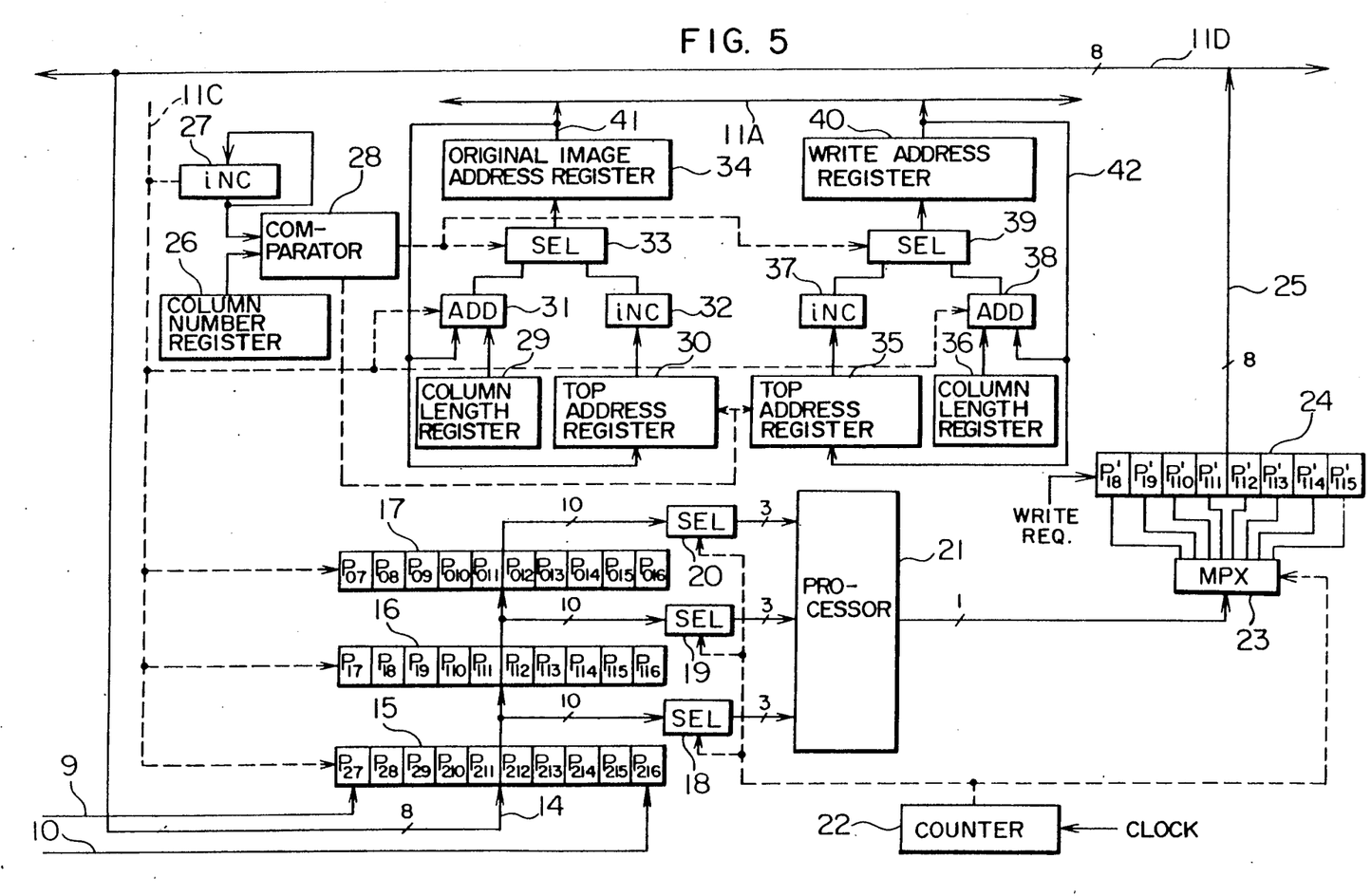
FIG. 5 is a circuit diagram showing an example of the arrangement of the image processing unit.

FIG. 5 shows the circuit arrangement of the image processing unit 2 for performing a 3×3 pixel matrix calculation.

Figure 6:
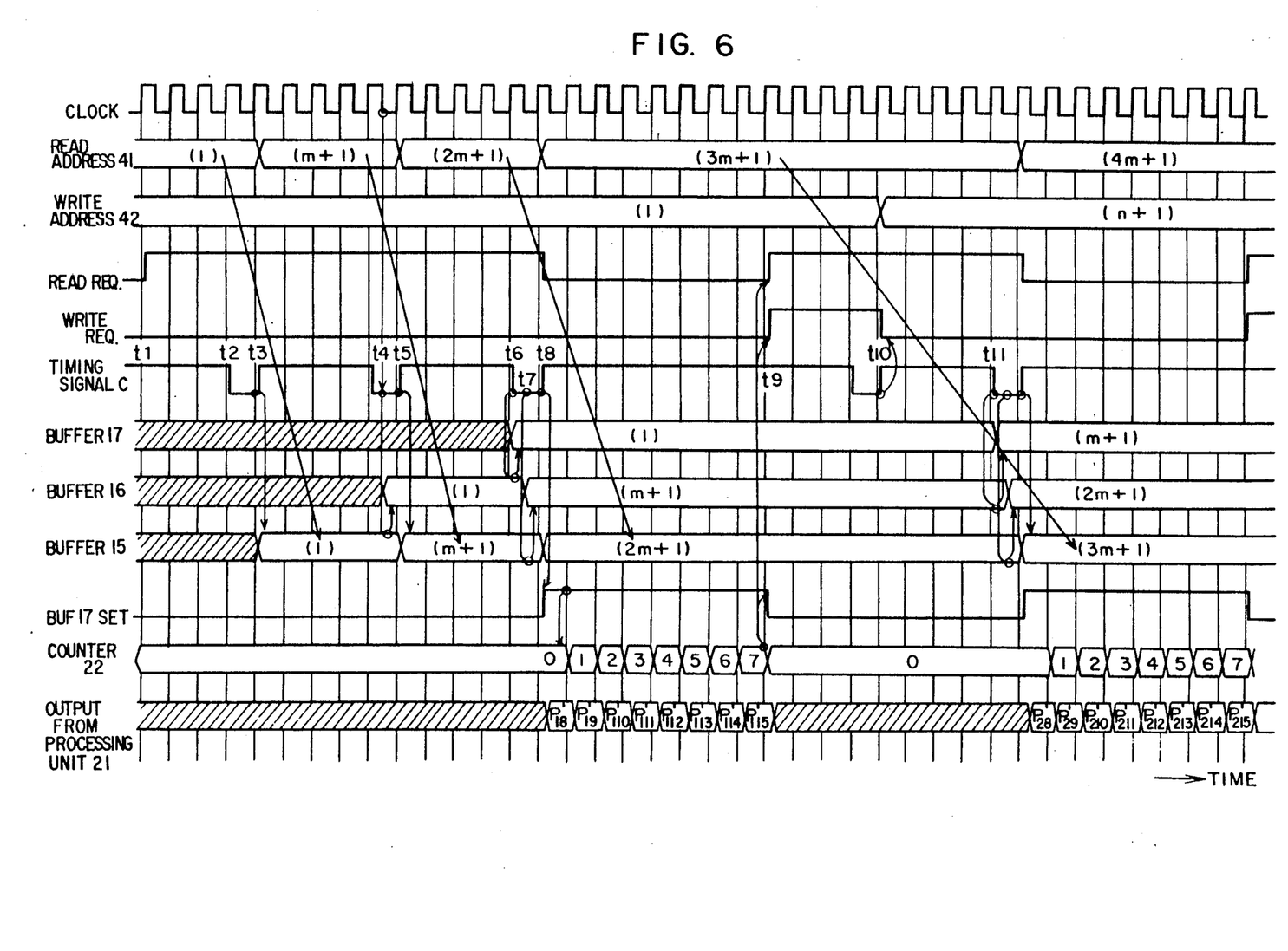
FIG. 6 is a timing chart illustrating the operation of the image memory and image processing unit shown in FIGS. 4 and 5.
Figure 7:
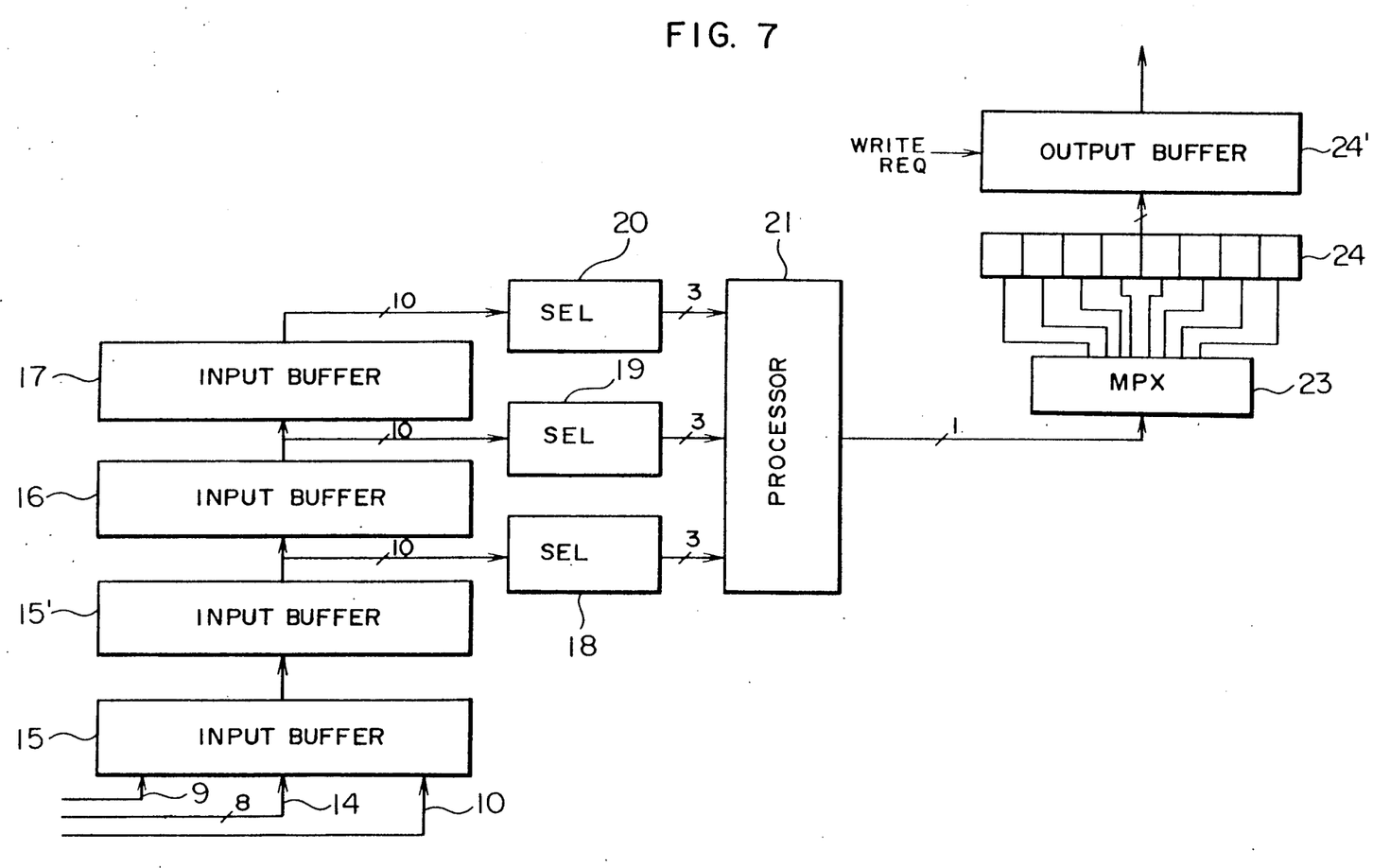
FIG. 7 shows a modification of the image processing unit of this invention.

The operation of the image memory shown in FIG. 4 and the image processing unit shown in FIG. 5 will be described with reference to the timing chart shown in FIG. 6.

Referring to FIG. 5, reference numeral 14 represents data inputted from the image memory via the 8-bit data line 11D on the system bus 11. The right and left neighborhood pixel of 2 bits are also inputted from the extended data lines 9 and 10, totalling to input data of 10 bits. A read address 41 outputted from an original image address register 34 (at time t1) is supplied to the image memory 1 via the address line 11A. Assuming that the address 41 indicates, for example, the address 1 of the memory cell B 46, the data at the address 1 are read out from the cell B and the neighborhood pixel data are read via the drivers 54 and 57. The read-out data are inputted to a first input buffer 15 (time t2). The timing when the data are inputted to the first buffer 15 is, for example, the leading edge (time t2) of a timing signal 11c which is a bus 11 ready signal. The timing signal 11c is outputted in synchro with clocks.

Next, the next column address (m+1) on the same row is outputted as the read address 41 to access the memory cell B 46. Then, the data at the address (m+1) and the neighborhood pixel data are read out from the memory cell B 46. The data previously stored in the first buffer 15 are transferred to a second input buffer in synchro with, e.g., substantially the intermediate point between the leading and trailing edge of the next timing signal 11c (time t4). Thereafter, the synchro with the leading edge of the same timing signal 11c, the data at the address (m+1) and their neighborhood pixel data are stored in the first input buffer 15 (time t5).

Similarly, the data at the second next column address (2m+1) on the same row and their neighborhood pixel data are read in response to the read address 41. The data in the second buffer 16 are transferred to a third input buffer 17 in synchro with, e.g., the trailing edge of the timing signal 11c (time t6), and thereafter in synchro with the intermediate point between the trailing and leading edges of the timing signal 11c, the data in the first input buffer are transferred to the second input buffer (time t7). Thereafter, the data at the address (2m+1) and their neighborhood pixel data are stored in the first buffer 15 in synchro with the leading edge of the timing signal 11c (time t8). At the leading edge of the timing signal 11c, a read request on the bus 11 is terminated, and outputting the timing signal 11c is also terminated.

As seen from the foregoing description, the data in the first to third input buffers 15 to 17 are always arranged such that the data at the column including the objective pixel to be subjected to a neighborhood operation are stored in the second input buffer 16, the data at the upper and lower columns are stored in the third and first input buffers 17 and 14, respectively. In response to clocks, a counter 22 sequentially generates a signal for selecting three pixel data in the input buffers 15 to 17. The count operation of the counter 22 starts when a buffer 17 set signal becomes high level (representative of a state under neighborhood operation) in response to the leading edge of the timing signal 11c at time t8. Therefore, for instance, if the counter 22 is now outputting a signal to select the 0th, 1st and 2nd bits of the input buffers, then in response to the next clock, the content of the counter 22 is changed by 1 so that the counter 22 controls selectors 18 to 20 to output the 1st, 2nd and 3rd bits of the input buffers. A processor 21 performs a 3×3 pixel neighborhood operation based on the pixel data selected by the selectors 18 to 20. Thus, when the value of the counter 22 is 0, a neighborhood operation for a pixel $P_{18}$ is performed to calculate a new output value $P_{18}'$ of the pixel $P_{18}$. When the values of the counter 22 take sequentially 1 to 7, the new output values $P_{19}'$ to $P_{115}'$ of the pixels $P_{19}$ to $P_{115}$ are calculated.

The value of the counter 22 also serves as a control signal for a multiplexer 23 which determines at what bit position of an output buffer 24 the pixel data from the processor 21 are to be written. In this embodiment, the number of objective pixels, within the data stored in the input buffer 16, to be subjected to a neighborhood operation, is 8 ($P_{18}$ to $P_{115}$). Therefore, when the clock 22 counts clocks eight times, issued are a next column address data read request and an operation result write request. At the same time, the input buffer 17 set signal is made low level (representative of the completion of operation) and the timing signal is caused to start again (time t9). Consequently, the data in the output buffer 24 are transferred to the image memory so that the values of the pixels $P_{18}$ to $P_{115}$ are overwritten with the new count values $P_{18}'$ to $P_{115}'$. After completion of writing the new data, a write request signal is reset in response to the timing signal 11c (t10). Upon the next timing signal, the processing for the next column starts, namely, the neighborhood operation for the pixels $P_{28}$ to $P_{215}$ starts (time t11).

After completion of the operation for all the pixel columns at addresses from (m+1) to (l−1)·m+1 in the row R1, all the data in the input buffers 15 to 17 are overwritten with the data at addresses 2, (m+2) and (2m+2) in the row R2, to thereby start the operation for pixel data at address (m+2).

The above operation can be executed at higher speed if data transfer and data processing are carried out at the same time. This is possible if the first input buffer 15 and output buffer 24 are replaced with double buffers (by adding other input buffer 15' and output buffer 24'). In particular, while data transfer is carried out at the input buffer 15 and output buffer 24', the other input buffer 15' and output buffer 24 serve for the neighborhood operation and the operation result writing. Namely, in FIG. 6, a read request continues to issue during the period from time t8 to t9 so that the next data at address (3m+1) can be written in the buffer 15.

An address generating circuit will then be described. The image processing unit has a function to access to an original image read address 41 and a write address 42. The address renewal timing is at the leading edge of the timing signal which indicates that data transfer of one byte on the system bus 11 has completed. A next or lower column address is obtained by adding the address length m corresponding to one column to the current address. An original image address is set at the original image address register 34 shown in FIG. 5. The current original image address 41 from the original image address register 34 and the value m of a column length register 29 are inputted to an adder 31 to generate the next read address. The uppermost column address 0 of an original image is set at a top address register 30. Consider the case where the lowermost column C1 address 1m changes to the first column address 1 in the first column C0 as shown in FIG. 3. In this case, after the lowermost column C1 is read, an incrementer 32 generates an address obtained by adding 1 to the top address 30. After the obtained address is stored in the original image address register 34, the addresses are sequentially renewed to the lower column address. A selector 33 selects either the column length m added address outputted from the adder 31 or the uppermost next column address outputted from the incrementer 32, and supplies the selected one to the original image address register 34. Such selection is conducted as follows. An incrementer 27 counts the number of leading edges of the timing signal 11c representative of a completion timing of data transfer, and a comparator 28 compares the count value with the value of a column number register 26. If a coincidence is met, the value obtained by adding 1 to the top address in the top address register 30 is selected and supplied to the original image address register 34. The new value incremented by 1 is also supplied to the top address register 30.

In the similar manner, an address generating circuit 35 to 40 for generating addresses used in writing the processed results can be realized. In this case, a control method different from generating an original image address is applied. Namely, during the period while the pixel data at the uppermost column C0 and next column C1 are read, all the data for 3×3 matrix calculation are not still stored and the neighborhood operation is not still executed. Therefore, output data from the processor 21 are not present. For this reason, although the original address register 34 is renewed, the write address register 40 is not renewed. In the other cases, the register 40 is renewed in quite the same manner as the original image address register 34.

Without using the incrementer 32, top address register 30, selector 33, the uppermost column C0 address to be next accessed may be generated by inputting to the adder 31 (1−1m) after the lowermost column C1 is read.

In the above embodiment, the 3×3 pixel neighborhood operation has been described. However, the present invention is not limited thereto, but it is also applicable to other matrix calculation such as 5×5 pixel matrix calculation.

Further, data in the first to third input buffers 15 to 17 are transferred between these buffers in synchro with the timing signal. However, data transfer between the input buffers may be dispensed with, for example, in the following manner. Data at addresses 1, (m+1) and (2m+1) and their neighborhood pixel data are directly stored in the first to third input buffers. Then, data corresponding to 9 pixels necessary for neighborhood operation are read from the input buffers without data transfer between the input buffers. Input data are directly rewritten to the associated input buffer.

In the above embodiment, after the neighborhood operation for one row, the neighborhood operation for the next row has been conducted such that a plurality of pixel groups at columns C0 to C2 are read out from the image memory to thus overwrite the data in the first to third input buffers 15 to 17. Completion of the neighborhood operation for a plurality of pixel columns in one row can be discriminated based on an output from the comparator 28. Therefore, a read request signal (FIG. 6) is controlled such that in response to an output from the comparator 28, a plurality of pixel groups at three columns in the next row are read from the image memory.

The read request signal is also controlled such that a plurality of pixel groups at three columns in one row (e.g., row R0) are read from the image memory at the time of initializing the apparatus.

The present invention is suitable for applications to an image processing apparatus constructed of a direct memory access (DMA) controller which controls memory addresses.

As described in detail so far, according to the image processing apparatus of this invention, a series of pixels at a same address and the right and left neighborhood pixels necessary for neighborhood operation are read as one group from an image memory, and a necessary number of groups of pixel data in the column direction required for the neighborhood operation are sequentially read from the image memory and stored in a temporary memory provided at a processing unit. Therefore, the capacity of the temporary memory can be reduced considerably as compared with a prior art. Further, the pixels necessary for the neighborhood operation can be read once from the image memory into the temporary memory without repetitive read operations (accesses). The access time to the image memory is therefore shortened, thus speeding up the processing and affording other advantageous effects.

We claim:

1. An image processing apparatus for image processing image data consecutive in column and row directions and determining an output value of an objective pixel to be image processed by processing the value of the objective pixel and the values of pixels adjacent to the objective pixel in the column and row directions necessary for a neighborhood operation with respect to the objective pixel, comprising:

an image memory for storing said image data consecutive in the column and row directions;

reading means, in response to one address access, for reading from said image memory a series of pixels within one column at one row and at least one pixel adjacent to said one row in the column direction necessary for said image processing as one group of pixels at a time;

a temporary memory for sequentially storing said one group of pixels read from said reading means, by an amount corresponding to a number of groups of pixels adjacent in the row direction that are necessary for said image processing, as one unit of said groups of pixels; and operation means for reading the value of said objective pixel and the values of pixels adjacent to said objective pixel necessary for said neighborhood operation of said objective pixel from said temporary memory, and subjecting the value of said objective pixel and the values of said adjacent pixels to said neighborhood operation to determine the output value of said objective pixel, said operation means performing said neighborhood operation for each pixel of said series of pixels, stored in said temporary memory, at one row as said objective pixel within one address access period.

2. An image processing apparatus according to claim 1, wherein said image memory comprises a plurality of memory cells each storing data on a pixel unit basis, consecutive two addresses being assigned each to a different one of said memory cells; and said reading means reads, in response to one address access, data of one pixel row from a corresponding one of said memory cells, and data of said at least one pixel adjacent to said one read row in the column direction from another memory cell having an address before or after the address of said one memory cell.

3. An image processing apparatus according to claim 1, wherein when said operation means completes a neighborhood operation process for each pixel of one pixel row stored in said temporary memory, said reading means reads from said image memory another pixel group located at one end of said one unit of pixel groups in the row direction and overwrites said another pixel group on one pixel group located at the other end of said one unit of pixel groups in the row direction in said temporary memory; and said operation means performs a neighborhood operation process for another pixel row adjacent to said one pixel row in the row direction.

4. An image processing apparatus according to claim 3, wherein after completion of a neighborhood operation process for a series of pixels at one row, said reading means reads from said image memory one unit of pixel groups at another row adjacent said one row and overwrites said read-out one unit of pixel groups on said temporary memory.

5. An image processing method for use with an image processing apparatus for image processing image data consecutive in the column and row directions and determining an output value of an objective pixel to be image processed by processing the value of the objective pixel and the values of pixels adjacent to the objective pixel in the column and row directions necessary for a neighborhood operation with respect to the objective pixel, said image processing apparatus having an image memory for storing said image data consecutive in the column and row directions on a pixel unit basis, and a temporary memory for storing said image data read out from said image memory, said image processing method comprising:

a first step of reading from said memory a series of pixels within one column at one row and at least one pixel adjacent to said one row in the column direction necessary for said image processing as one group of pixels at a time;

a second step of sequentially storing in said temporary memory said one group of pixels read from said reading means, by an amount corresponding to a number of groups of pixels adjacent in the row direction that are necessary for said image processing, as one unit of said groups of pixels; and a third step of reading the value of said objective pixel and the values of pixels adjacent to said objective pixel necessary for said neighborhood operation of said objective pixel from said temporary memory, and subjecting said value of said objective pixel and the values of said adjacent pixels to said neighborhood operation to determine the output value of said objective pixel, said operation means performing said neighborhood operation for each pixel of said series of pixels, stored in said temporary memory, at one row as said objective pixel within one address access period.

6. An image processing method according to claim 5, wherein said image memory comprises a plurality of memory cells each storing data on a pixel unit basis, consecutive two addresses being assigned each to a different one of said memory cells; and in said first step, read in response to one address access are data of one pixel row from a corresponding one of said memory cells, and data of said at least one pixel adjacent to said one read row in the column direction from another memory cell having an address before or after the address of said one memory cell.

7. An image processing method according to claim 5, wherein when a neighborhood operation process for one pixel row stored in said temporary memory is completed, said one pixel row is erased from said temporary memory, another pixel group located at one end of said one unit of pixel groups in the row direction is read from said image memory, said another pixel group is overwritten on one pixel group located at the other end of said one unit of pixel groups in the row direction, and a neighborhood operation process starts for another pixel row adjacent to said one pixel row in the row direction.

8. An image processing method according to claim 7, wherein after completion of a neighborhood operation process for a series of pixels at one row, one unit of pixel groups at another row adjacent said one row is read from said image memory and overwritten on said temporary memory.

9. An image processing method according to claim 5, wherein a series of pixels at one row are sequentially subjected to a neighborhood operation and after the completion of said neighborhood operation, a neighborhood operation is performed for another series of pixels adjacent said one row.

10. An image processing apparatus for image processing image data consecutive in column and row directions and determining an output value of an objective pixel to be image processed by processing the value of the objective pixel and the values of $(N \times M - 1)$ pixels adjacent to the objective pixel in the column and row directions necessary for a neighborhood operation with respect to the objective pixel, wherein N and M are integers representing numbers of pixels consecutive in column and row directions, respectively comprising:

an image memory for storing said image data consecutive in the column and row directions on a pixel unit basis;

reading means, in response to one address access, for reading from said image memory a series of L pixels, where L is an integer greater than 1, within one column at one row and $(N-1)$ pixel(s) adjacent to said one row in the column direction necessary for said image processing as one group of pixels at a time;

a temporary memory for sequentially storing M groups of pixels read from said reading means as one unit of said groups of pixels; and operation means for reading the value of said objective pixel and $(N \times M - 1)$ pixels adjacent to said objective pixel necessary for said neighborhood operation of said objective pixel from said temporary memory, and subjecting the value of said objective pixel and the values of said adjacent pixels to said neighborhood operation to determine the output value of said objective pixel, said operation means performing, said neighborhood operation for each pixel of said series of L pixels, stored in said temporary memory, at one row as said objective pixel within one address access period.

11. An image processing apparatus according to claim 1, wherein said image memory comprises a plurality of memory cells each for storing data on a pixel unit basis, consecutive two addresses being assigned each to a different one of said memory cells; and said reading means reads, in response to one address access, L pixels of data of one pixel row from a corresponding one of said memory cells, and $(N-1)$ pixels adjacent to said one read row in the column direction from another memory cell having an address before or after the address of said one memory cell.

12. An image processing apparatus according to claim 1, wherein when said operation means completes a neighborhood operation process for each pixel of one pixel row stored in said temporary memory, said reading means reads from said image memory another pixel group located at one end of said one unit of pixel groups in the row direction and overwrites said another pixel group of one pixel group located at the other end of said one unit of pixel groups in the row direction in said temporary memory; and said operation means performs a neighborhood operation process for another pixel row adjacent to said one pixel row in the row direction.

13. An image processing apparatus according to claim 3, wherein after completion of a neighborhood operation process for a series of L pixels at one row, said reading means reads from said image memory one unit of pixel groups at another row adjacent said one row and overwrites said read-out one unit of pixel groups on said temporary memory.

14. An image processing apparatus according to claim 10, wherein at least one of the integers N and M is greater than 1.

* * * * *